United States Patent [19]

Takahashi

[11] Patent Number: 4,914,924

[45] Date of Patent: Apr. 10, 1990

[54] VEHICLE AIR CONDITIONING SYSTEM BASED ON FUZZY INFERENCE

[75] Inventor: Hiroshi Takahashi, Zushi, Japan

[73] Assignee: Nissan Motor Co., Ltd., Japan

[21] Appl. No.: 217,857

[22] Filed: Jul. 12, 1988

[30] Foreign Application Priority Data

Jul. 17, 1987 [JP] Japan .................................. 62-178658

[51] Int. Cl.⁴ ............................................. B60H 1/32
[52] U.S. Cl. ........................................ 62/133; 62/243; 165/43; 236/91 C
[58] Field of Search ................. 62/133, 163, 243, 244, 62/323.4; 236/91 C; 165/42, 43

[56] References Cited

U.S. PATENT DOCUMENTS 4,375,754 3/1983 Okura ................................ 165/43 X
4,510,764 4/1985 Suzuki ............................... 62/163 X
4,777,585 10/1988 Kokawa et al. ................. 364/513 X
4,809,175 2/1989 Hosaka et al. ................... 180/170 X

OTHER PUBLICATIONS

"Making Computers Think Like People", IEEE Spectrum, Aug. 1984, The Institute of Eletrical and Electronics Engineers, Inc.

Primary Examiner—Harry B. Tanner
Attorney, Agent, or Firm—Leydig, Voit & Mayer

[57] ABSTRACT

A vehicle air conditioning system is provided with various sensors such as inside and outside temperature sensors, engine coolant temperature sensor, solar radiation sensor and throttle opening sensor, and a control unit for producing one or more control signals to control the position of an air mix door, the speed of a blower and/or a clutch of a compressor, by performing fuzzy inference in response to input signals derived from the sensors.

13 Claims, 8 Drawing Sheets

(1) RELATION BETWEEN DEVIATION (e) & AIR MIX DOOR POSITION (1 --- OPEN, -1 --- CLOSE)

LCR 1     LCR 2

(2) RELATION BETWEEN VARIATION ($\Delta e$) OF e & AIR MIX DOOR POSITION (1 --- OPEN, -1 --- CLOSE)

LCR 3     LCR 4

(3) RELATION BETWEEN e & AIR QUANTITY (1 --- HIGH BLOWER SPEED, -1 --- LOW BLOWER SPEED)

LCR 5     LCR 6

FIG. 4B

RELATION BETWEEN ENGINE COOLANT TEMPERATURE
& AIR MIX DOOR POSITION ( 1 ··· OPEN, −1 ··· CLOSE )

RELATION BETWEEN SOLAR RADIATION INTENSITY & AIR QUANTITY OR AIR MIX DOOR POSITION WHEN e< 0 ( 1 ··· HIGH BLOWER SPEED, OPEN ; −1 ··· LOW BLOWER SPEED, CLOSE )

RELATION BETWEEN SOLAR RADIATION INTENSITY & AIR QUANTITY OR AIR MIX DOOR POSITION WHEN e > 0 ( 1 ··· HIGH BLOWER SPEED, OPEN ; −1 ··· LOW BLOWER SPEED, CLOSE )

FIG. 4C

RELATION BETWEEN INSIDE-OUTSIDE TEMPERATURE DIFFERENCE (E) & AIR MIX DOOR POSITION ( 1 --- OPEN, -1 --- CLOSE )

(7)

RELATION BETWEEN VARIATION ($\Delta$ TVO) OF THROTTLE OPENING & CLUTCH ( 1 --- ENGAGE CLUTCH, -1 --- DISENGAGE CLUTCH )

(8)

RELATION BETWEEN THROTTLE OPENING (TVO) & CLUTCH ( 1 --- ENGAGE CLUTCH, -1 --- DISENGAGE CLUTCH )

VEHICLE AIR CONDITIONING SYSTEM BASED ON FUZZY INFERENCE

REFERENCE TO RELATED APPLICATION

U.S. patent application Ser. No. 175,350, filed on Mar. 30, 1988, Pat. No. 4,841,815, relates to a fuzzy control system for an automatic transmission.

BACKGROUND OF THE INVENTION

The present invention relates to an air conditioning system for a vehicle, and more particularly to a vehicle air conditioning system capable of providing continuous and smooth air conditioning.

Vehicle air conditioning systems are divided broadly into the reheat type and the air mix type. In the reheat type intake air is first cooled, and then heated to a desired temperature by a heater. In the air mix type, the desired air temperature is attained by varying the mixing ratio between cool air and hot air. However, there is little difference between the two types with respect to control method.

Figure 6:
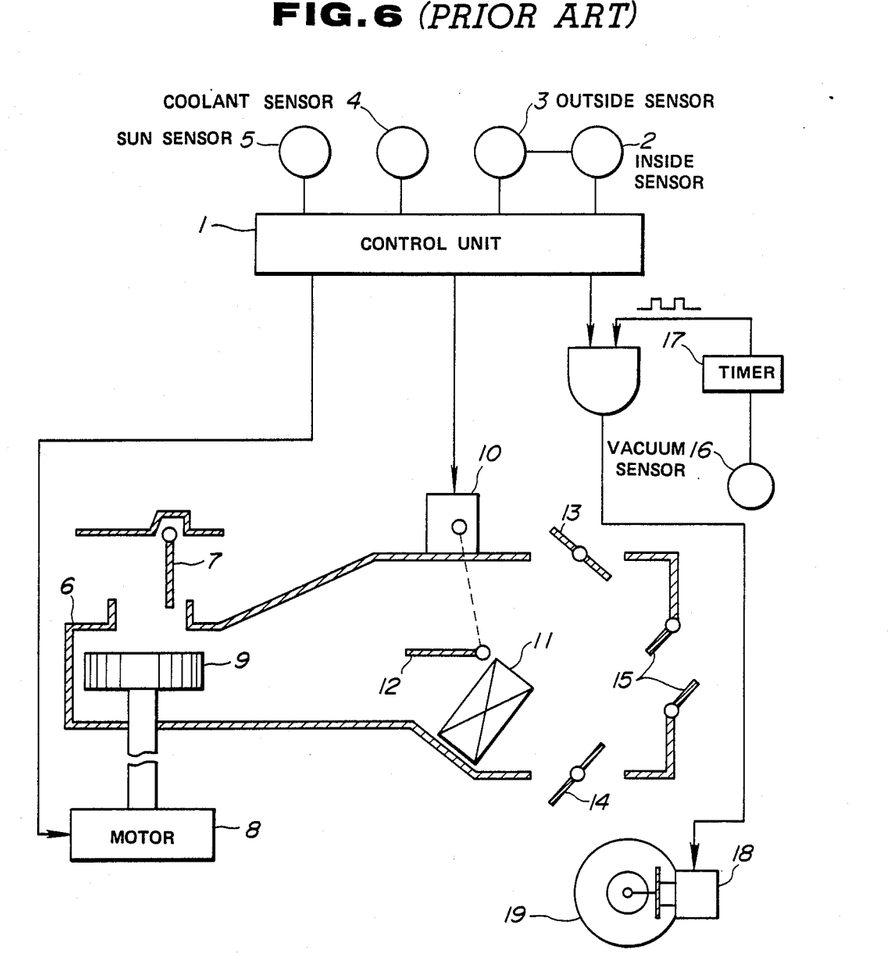
FIG. 6 is a schematic view showing a conventional air conditioning system.

FIG. 6 shows one conventional automatic vehicle air conditioning system belonging to the air mix type.

The air conditioning system of FIG. 6 includes a control unit 1 composed of electrical circuits, a sensor 2 for sensing the temperature of inside air in the interior of the vehicle, a sensor 3 for sensing the temperature of outside ambient air, a sensor 4 for sensing the temperature of engine cooling water, and a sunshine output 5. Sensor signals of the sensors 2–5 are input to the control unit 1.

A conditioning equipment 6 includes an intake door 7 for adjusting the amount of incoming air from the inside or outside of the vehicle, a blower 9 driven by a blower motor 8, and an air mix door 12 for adjusting the amount of air passing through a heater 11. The position of the air mix door 12 is controlled by a door position control servo 10. The air conditioning equipment 6 further includes a defroster door 13 for adjusting the amount of air supplied to a defroster, a foot door 14 for adjusting the amount of air discharged toward the feet of occupants, and a ventilator door 15 for adjusting the amount of air supplied to a ventilator. The air mix door 12 is disposed between an inlet side on which the intake door 7 is provided, and an outlet side on which the defroster door 13, foot door 14 and ventilator door 15 are provided.

In this air conditioning system, the control unit 1 is arranged to perform feedback control based on the output signal of the inside temperature sensor 2 for controlling the inside temperature toward a desired temperature or a preset temperature, and a feed-forward control based on the output signals of the outside temperature sensor 3 and the sunshine sensor 5 so as to satisfy a predetermined thermal equilibrium condition. The control unit 1 sends control signals to the blower motor 8 and the door position control servo 10.

When rapid acceleration of the vehicle or a high load is detected by a vacuum switch 16 for sensing an intake manifold negative pressure in an engine system, a timer 17 is actuated. While the timer 17 is operative, a compressor clutch 18 is disengaged, and accordingly an air conditioning compressor 19 is held inoperative to give priority to the running performance of the vehicle.

In this conventional system, however, the timer 17 is operated intermittently, the fine adjustment of cut-off duration for interrupting the compressor is difficult and possible only in a narrow range, and information about the inside temperature is not used in determining the cut-off duration. Therefore, this conventional system tends to allow a sharp increase in the inside temperature especially when rapid acceleration or high load operation is continued in summer, by failing to maintain an adequate balance between the running performance of the vehicle, and the performance in air conditioning. Even though a microcomputer or other complicated circuitry is employed to optimize the control of the air conditioning, the tuning process during initial adjustment is troublesome and time-consuming because the number of control parameters is large.

SUMMARY OF THE INVENTION

It is an object of the present invention to provide a vehicle air conditioning system capable of controlling the internal environmental of the vehicle smoothly and continuously.

According to the present invention, a vehicle air conditioning system comprises air conditioning equipment, sensing means and controlling means. The air conditioning equipment comprises a temperature control actuator for varying the temperature of discharge air discharged by the air conditioning equipment into a passenger compartment of the vehicle in accordance with a temperature control signal. The sensing means senses the inside air temperature in the passenger compartment of the vehicle, and determines a first sensed variable such as a deviation of the inside air temperature from a desired value set by the driver. The controlling means performs a fuzzy inference in response to the first sensed variable and produces a temperature control signal in accordance with the result of the fuzzy inference.

DETAILED DESCRIPTION OF THE INVENTION

Figure 1:
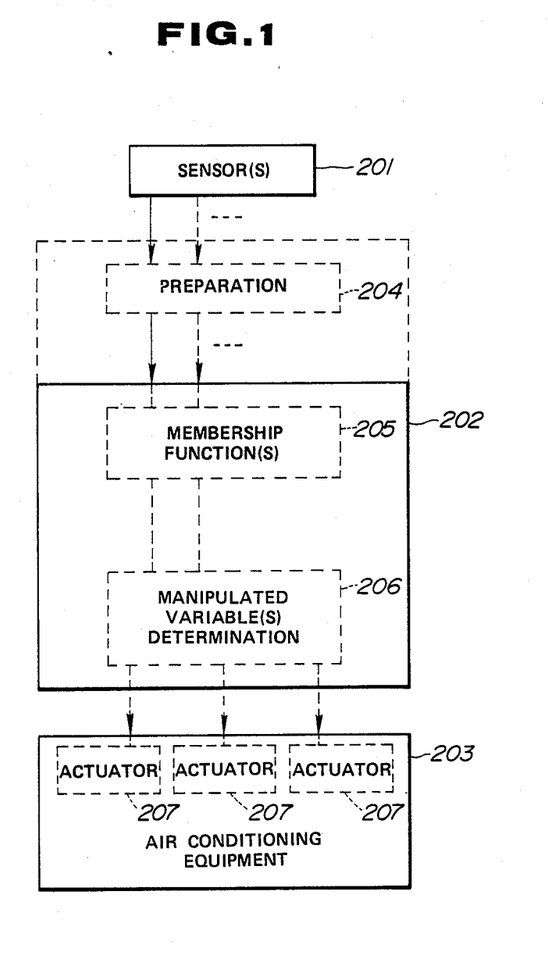
FIG. 1 is a block diagram of a basic arrangement of a vehicle air conditioning system according to the present invention.

FIG. 1 is a block diagram of a basic arrangement of the present invention. The air conditioning system shown in FIG. 1 includes a sensor group 201, a control unit 202 and air conditioning equipment 203.

The sensor group 201 includes one or more sensors for sensing one or more environmental conditions such as inside and outside air temperatures, humidity and sun radiation intensity, and/or one or more vehicle conditions affecting air conditioning performance or representing the driver's intention.

The control unit 202 may include a preparing section 204, a fuzzy inference section 205 and a manipulated variable determining section 206. Alternatively, the preparing section 204 may be provided outside the control unit 202. The preparing section 204 is designed to produce input signals to be input to the fuzzy inference section 205. For example, the preparing section 204 converts the sensor signals from an analog form into a digital form, or determines the deviation of the sensor signal from a desired value.

The fuzzy inference section 205 sets at least one membership function for each input variable supplied from the preparing section 204 and provides output variables each of which is a value of the membership function corresponding to the input variable. The manipulated variable determining section 206 determines one or more manipulated variables from the output variables, and produces one or more control signals each representing the manipulated variable.

The air conditioning equipment 203 includes one or more actuators for controlling the temperature of discharge air discharged into a compartment of the vehicle, or controlling the amount of the discharge air, or controlling a clutch of an air conditioning compressor in response to the control signals sent from the control unit 202.

Figure 2:
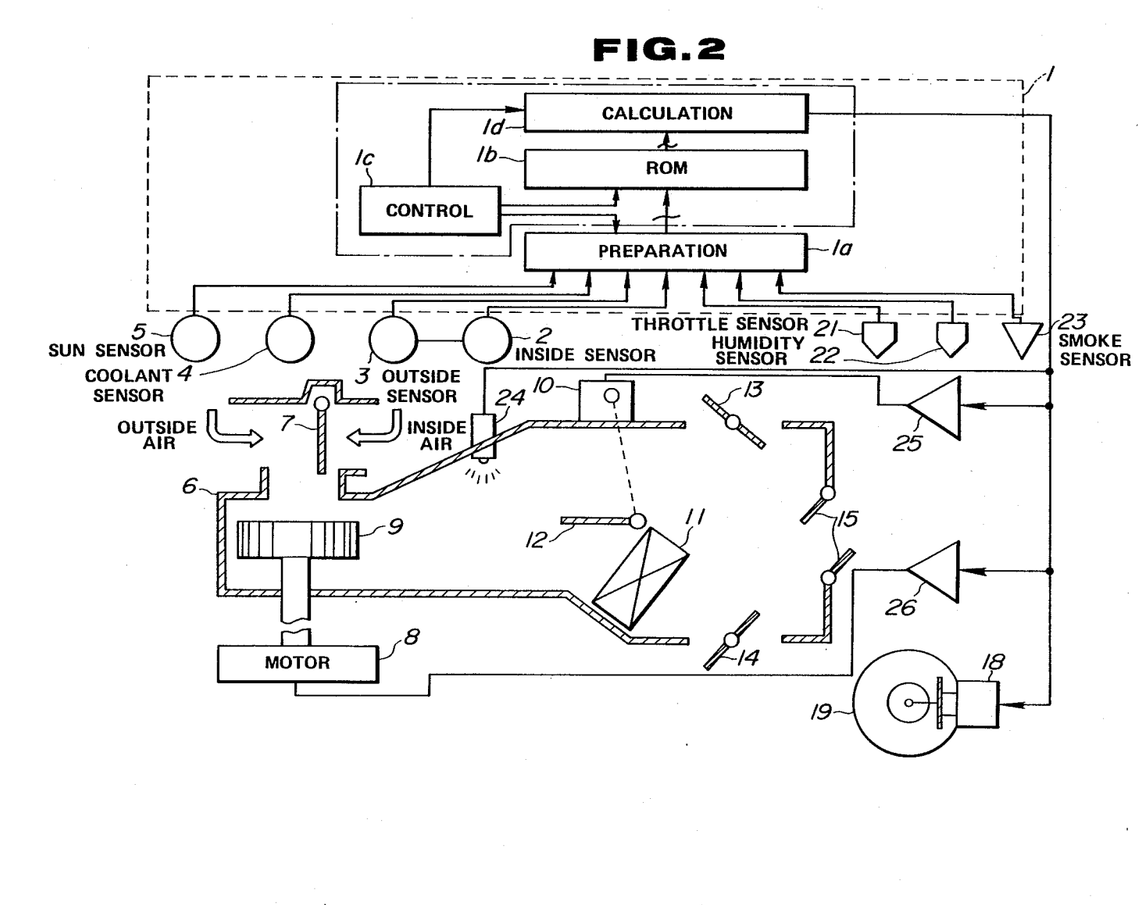
FIG. 2 is a schematic view showing a vehicle air conditioning system according to one embodiment of the present invention.

FIG. 2 shows one embodiment of the present invention.

The air conditioning system of FIG. 2 has a control unit 1 which includes a preparing section 1a, a storage section 1b, a control section 1c, and a calculating section 1d.

The preparing section 1a of this embodiment includes an A/D converter for changing input information supplied from various sensors from an analog form into a digital form. For example, the digital signals provided by the A/D converter are 2 to 8 bits long.

The storage section 1b of this embodiment is a ROM. The storage section 1b stores a plurality of membership functions used for fuzzy inference. The control section 1c stores logic for the fuzzy inference. The calculating section 1d calculates manipulated variables and outputs control signals to external actuators.

The sensors employed in the system of FIG. 2 are an inside air temperature sensor 2, an outside air temperature sensor 3, an engine cooling water temperature sensor 4, a sunshine sensor 5, a throttle opening sensor 21, a humidity sensor 22 and a smoke sensor 23. All these sensors are connected to the preparing section 1a of the control unit 1. The sensors 2-5 are substantially the same as the sensors 2-5 of FIG. 6. The throttle opening sensor 21 is used as a sensor for sensing the driver's intention to accelerate.

The air conditioning equipment 6 shown in FIG. 2 includes an intake door 7 for controlling the amount of incoming air (inside recirculation air or outside fresh air), a blower 9 driven by a blower motor 8, an air mix door 12, a heater 11, and a humidifier 24.

The equipment 6 further includes a defroster door 13, a foot door 14 and a ventilation door 15, which are similar to doors 13-15 of FIG. 6.

The air mix door 12 is disposed between the inlet side including the intake door 7 and the blower 9, and the outlet side including the outlet doors 13, 14 and 15. The position of the air mix door 12 is controlled by a servo 10.

An air conditioning compressor 19 is equipped with a compressor clutch 18, which is controlled by a control signal of the control unit 1. A servo driver 25 and motor amplifier 26, are both controlled by control signals of the control unit 1. The servo driver 25 drives the servo 10, and the motor amplifier 26 drives the blower motor 8.

Figure 3:
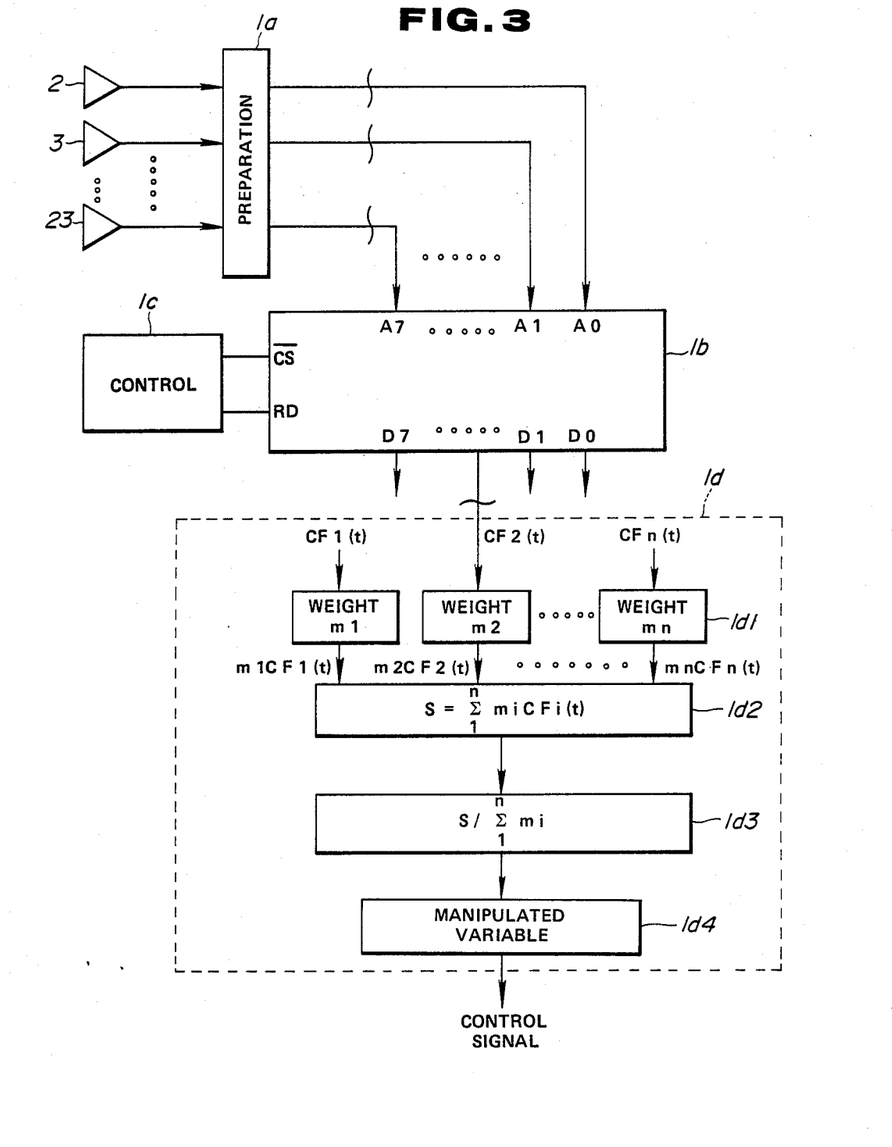
FIG. 3 is a block diagram showing a control unit of the system shown in FIG. 2.

FIG. 3 shows the control unit 1 in detail.

The preparing section 1a including the A/D converter prepares the input signals to the ROM section 1b from the sensor signals. The ROM section 1b provides the output signals representing CF values (degrees of definiteness), which are supplied to the calculating section 1d.

The calculating section 1d includes a plurality of weighting subsections 1d1 a summing subsection 1d2, a dividing subsection 1d3 and a multiplying subsection 1d4. The output signals of the ROM section 1b are input corresponding weighting subsections 1d1, Each weighting subsection 1d1 multiplies the input CF value by a predetermined weight value m1, m2 . . . or mm. The summing subsection 1d2 determines the sum of the products determined by the weighting subsections. The dividing subsection 1d3 determines a weighted average by dividing the output of the summing subsection 1d2 by the sum of the weight values. The multiplying subsection 1d4 determines a manipulated variable from the weighted average and produces a control signal representing the manipulated variable. In this embodiment, the calculating section 1d is arranged to determine at least three different weighted averages and manipulated variables and at least three control signals for controlling three different actuators.

Figure 4A:
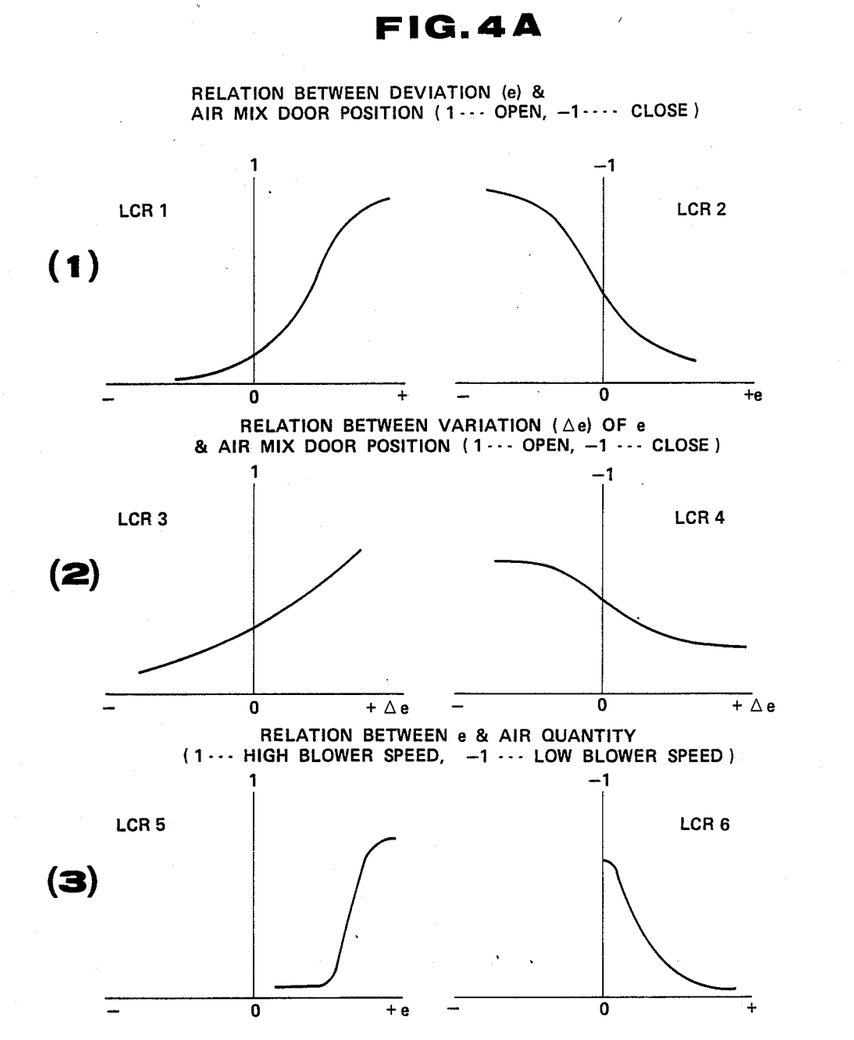
FIGS. 4A, 4B and 4C are graphs of various membership functions used in the control unit of FIG. 3 for fuzzy inference.
Figure 4B:
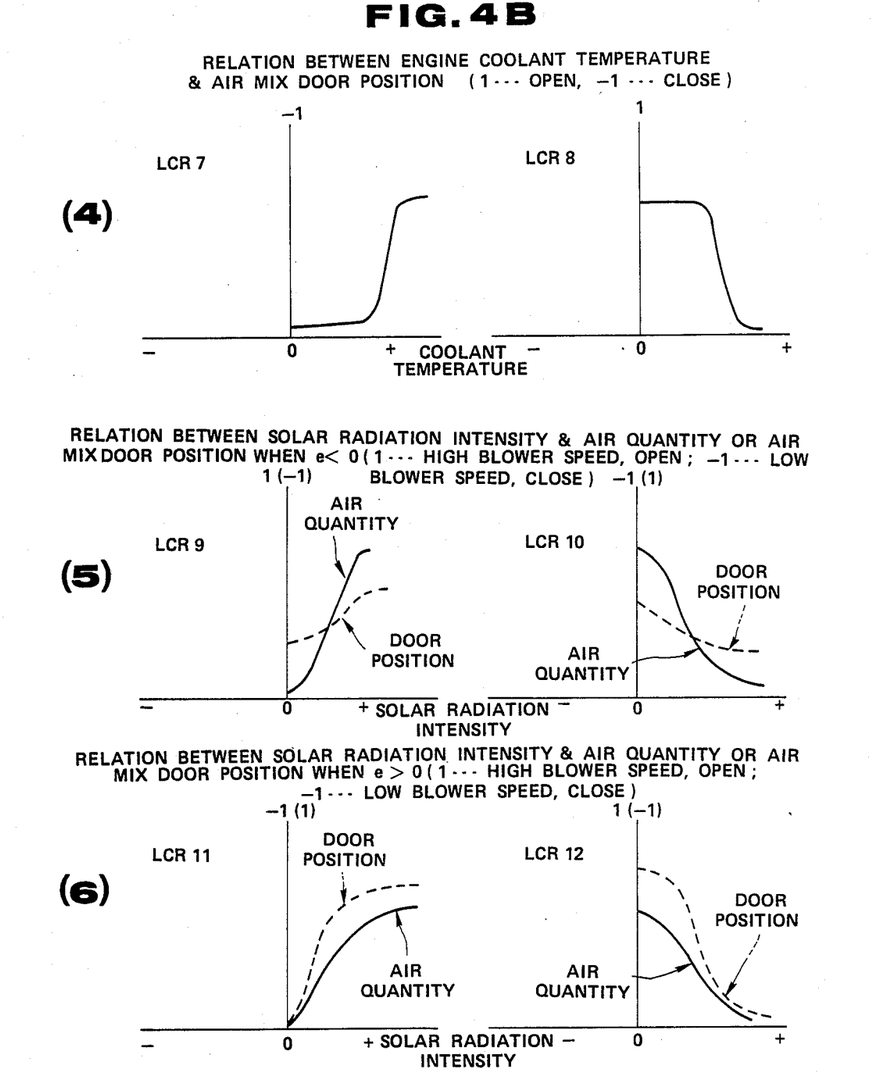
Figure 4C:
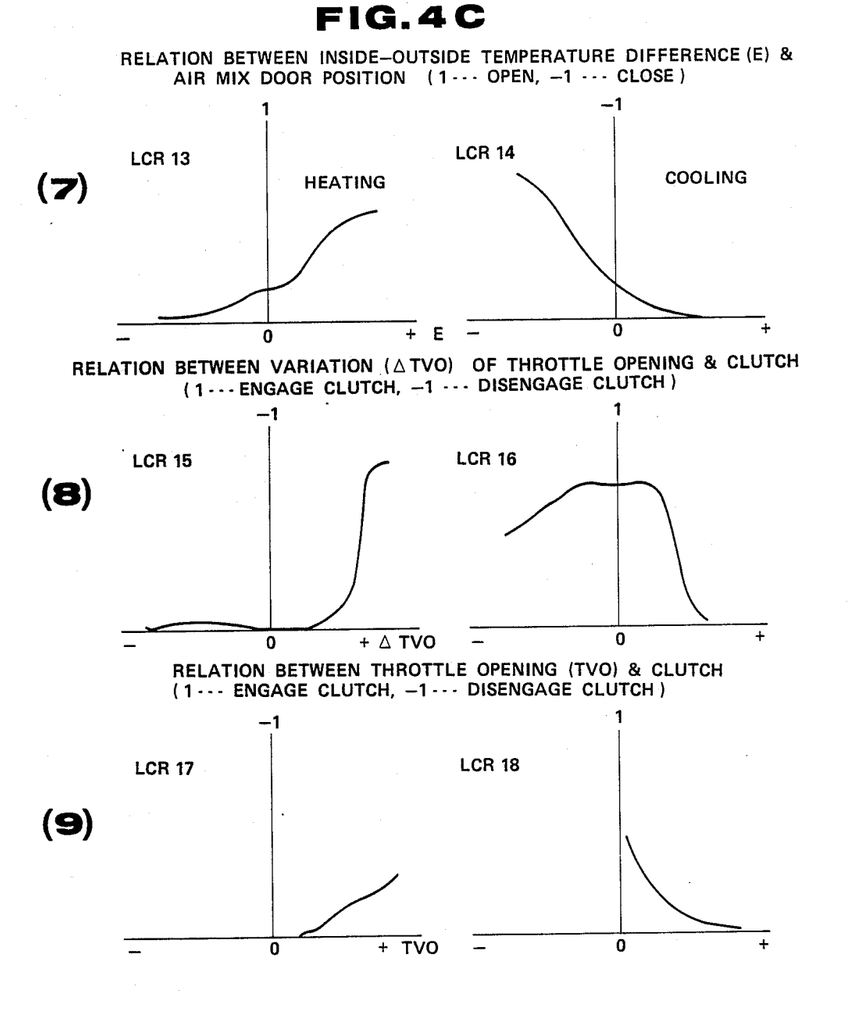

FIGS. 4A, 4B and 4C show membership functions employed in this embodiment. These membership functions are determined from control laws each of which is a qualitative description or statement of a particular operation of the air conditioning equipment. In this embodiment, the following eighteen control laws (LCR1-LCR18) are prepared.

LCR1 (the first control law) . . . If the control deviation e of the current value of the inside air temperature from a desired value (the desired value—the current inside air temperature=e) is positive, then the control unit 1 opens the air mix door 12. In this embodiment, the air mix door 12 is arranged to increase the amount of air passing through the heater 11 by swinging upwardly in FIG. 2 when the air mix door 12 is opened. The amount of the air admitted to heater 11 is decreased as the air mix door 12 is swung downwardly and closed.

LCR2 . . . If the control deviation e is negative, then the control unit 1 closes the air mix door 12.

LCR3 . . . If the variation (Δe) of the deviation e during a predetermined cycle is positive, then the control unit 1 opens the air mix door 12. The variation Δe (amount of change) corresponds to a first order derivative of the deviation e.

LCR4 . . . If the variation Δe is negative, then the control unit 1 closes the air mix door 12.

LCR5 . . . If the absolute value (abs(e)) is large, then the control unit 1 increases the quantity of discharge air.

LCR6 . . . If the absolute value abs(e) is small, then the control unit 1 decreases the quantity of discharge air.

LCR7 . . . If the engine cooling water temperature is high, then the control unit 1 closes the air mix door 12.

LCR8 . . . If the engine cooling water temperature is low, then the control unit 1 opens the air mix door 12.

LCR9 . . . If the sensed solar radiation quantity (or intensity) is high, and the deviation e is negative (the air is being cooled), then the control unit 1 increases the discharge air quantity, and closes the air mix door 12.

LCR10 ... If the solar radiation quantity is low and the deviation e is negative, then the control unit 1 decreases the discharge air quantity, and opens the air mix door 12.

LCR11 ... If the solar radiation quantity is high, and the deviation e is positive (the air is being heated), then the control unit 1 decreases the discharge air quantity and closes the air mix door 12.

LCR12 ... If the solar radiation quantity is low and the deviation e is positive, then the control unit 1 increases the discharge air quantity and opens the air mix door 12.

LCR13 ... If the inside-outside temperature difference E (=the inside temperature−the outside temperature) is positive (the air is being heated), then the control unit 1 opens the air mix door 12.

LCR14 ... If the temperature difference E is negative (the air is being cooled), then the control unit 1 closes the air mix door 12.

LCR15 ... If the variation (an amount of change) ($\Delta$TVO) of the throttle valve opening degree during a predetermined unit time length is large, then the control unit 1 increases the duration during which the cooling operation is cut off.

LCR16 ... If the variation $\Delta$TVO is small, then the control unit 1 decreases the cooler cutoff duration.

LCR17 ... If the throttle valve opening degree TVO is great, then the control unit 1 increases the cooler cutoff duration.

LCR18 ... If the throttle opening degree TVO is small, then the control unit 1 decreases the cooler cutoff duration.

The last four control laws LCR15–LCR18 are designed to provide a tradeoff between the cooling performance of the air conditioning system and the driving performance of the vehicle.

From each of these control laws, at least one membership function is determined as shown in FIGS. 4A, 4B and 4C. In each graph of FIGS. 4A, 4B and 4C, the sensed variable which is input to the ROM section 1b is the abscissa, and the value of the membership function (CF value) is the ordinate. As shown in FIGS. 4A, 4B and 4C, each membership function varies continuously and smoothly between zero, and plus or minus one. It is not necessary to conform the membership functions strictly to the forms shown in FIGS. 4A, 4B and 4C. The membership functions can be prepared more flexibly and empirically or experimentally.

Figure 5:
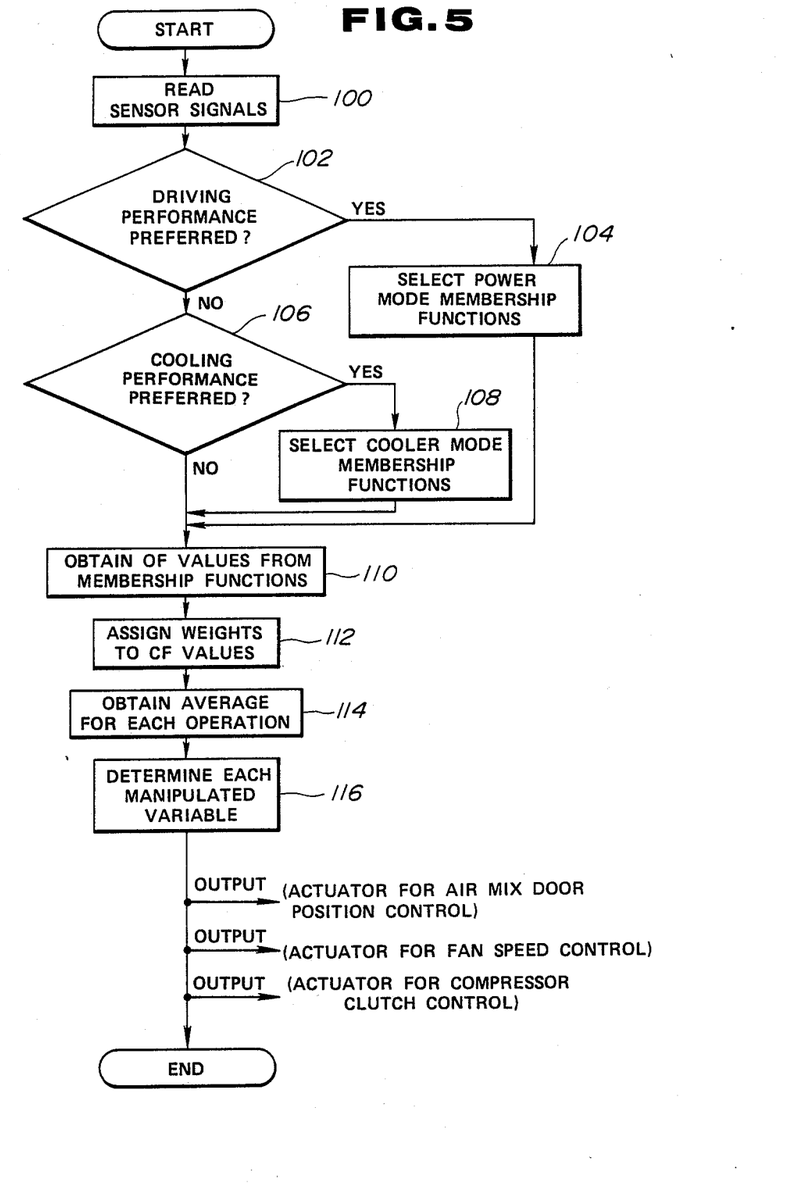
FIG. 5 is a flow chart of a control process performed by the control unit of FIG. 3.

FIG. 5 shows a control process of this embodiment.

In step 100, the control unit 1 reads the sensor signals of sensors 2–5 and 21–23, and prepares the sensed variables to be input to the ROM section 1b.

In step 102, the control unit 1 determines whether the driver prefers the vehicle's driving performance or not, by checking the position of a manual mode selector switch, for example. If preference is given to the vehicle's driving performance over the cooling performance, then the control unit 1 selects power mode membership functions in step 104. In this embodiment, there are prepared, for the four control laws LCR15–LCR18, the power mode membership functions and cooling mode membership functions in addition to the normal mode membership functions shown in FIG. 4C. For each of the four control laws LCR15–LCR18, there are one normal mode membership function, one power mode membership function and one cooling mode membership function. The power mode and cooling mode membership functions are prepared by modifying the corresponding normal mode membership function shown in FIG. 4C so as to give preference to driving performance or cooling performance, respectively.

If the answer in step 102 is negative, then the control unit 1 determines whether the driver prefers the cooling performance in step 106. If the answer is affirmative, then the control unit 1 selects the cooling mode membership functions at a step 108. If the answer in step 106 is negative, then the control unit 1 employs the normal mode membership functions.

In step 110, the control unit 1 determines the CF value of each membership function corresponding to a current value of the input sensed variable. In this embodiment, the preparation section 1a of the control unit 1 prepares the 8 bit digital signals from the sensor signals, and applies each digital signal to address inputs (A0–A7) of the ROM 1b, as shown in FIG. 3, to specify a particular memory location of the ROM 1b in which the CF value corresponding to the input value is stored. Thus, the ROM 1b provides the CF value through data output pins D0–D7 when a chip select signal (CS) and a read signal (RD) are applied from the control section 1c to the ROM section 1b.

In step 112, the control unit 1 collects the CF values output from the ROM section 1b into groups for operations such as air mix door operation, air quantity control operation and compressor clutch operation, and assigns weights to the CF values for each group. Each group of CF values is a subset of the set of all the CF values, selected for the operation of the air mix door position control, or the blower speed control or the compressor clutch control or other control. The control unit 1 prepares the subset for air mix door position control, the subset for blower speed control, the subset for compressor clutch control and so on. Then, the control unit 1 weights the CF values of each subset.

In step 114, the control unit 1 determines a weighted average of the CF values of each subset using the summing subsection 1d2 and the dividing subsection 1d3.

In step 116, the control unit 1 determines a manipulated variable for each subset by multiplying the weighted average of the subset by a predetermined coefficient. Thus, the control unit 1 determines the manipulated variable for air mix door position control by multiplying the weighted average of the subset for air mix door control by a predetermined coefficient for air mix door control, it determines the manipulated variable for blower speed control by multiplying the weighted average of the subset for blower speed control by a predetermined coefficient for blower speed control, and so on. Then, the control unit 1 delivers the control signal representing the manipulated variable for air mix door control to the driver 25, the control signal representing the manipulated variable for blower motor control to the motor amplifier 26, and the control signal representing the manipulated variable for compressor clutch control to the compressor clutch 18. Thus, the control system of this embodiment employs actuator's side membership function each of which is in the form of a straight line, and determines each manipulated variable by multiplying the weighted average by the coefficient which is the slope of the straight line of the corresponding actuator's side membership function.

The weighted average of each subset is within the range between plus one and minus one, and accordingly the manipulated variable obtained from the weighted average can assume positive, null or negative values. In air mix door control, for example, the control system increases the opening degree of the air mix door 12 when the manipulated variable is positive, decreases the degree of opening of the air mix door 12 when the manipulated variable is negative, and holds the current door position unchanged when the manipulated variable is zero.

It is possible to control the humidifier 22 and an air purifier by performing similar fuzzy inference based on output signals of the humidity sensor 22 and smoke sensor 23 in the same manner.

In this way, the control system of the present invention can control the vehicle inside temperature and other environmental conditions in a very smooth manner which is suitable human comfort, while maintaining adequate balance between the driving power and the air conditioning performance, unlike the conventional Neumann type control which tends to produce stepwise changes. The control system of the present invention is very adaptable to various requirements because it is not necessary to strictly determine control parameters of the air conditioning system but it is possible to choose membership functions with wide freedom.

The present invention is applicable to both air mix type systems and reheat type. For example, an evaporator can be placed between the blower 9 and the air mix door 12 in the equipment of FIG. 2 so that all the air from the blower 9 can be cooled.

What is claimed is:

1. A vehicle air conditioning system comprising:
   air conditioning equipment comprising air conditioning means for discharging conditioned air into a compartment of a vehicle, a temperature control actuator for varying the temperature of discharge air discharged from said air conditioning means into the vehicle compartment in accordance with a temperature control signal, and a restraining actuator for restraining the operation of said air conditioning means to prevent a decrease in the driving power of the vehicle in accordance with a restraint control signal;
   an inside temperature sensor for sensing the inside air temperature of the vehicle compartment;
   a vehicle condition sensor for sensing the condition of the vehicle;
   intention sensing means for sensing a driver's intention to accelerate the vehicle and determining a command variable representing the driver's intention;
   variable determining means for determining a first sensed variable which is the deviation of the inside temperature sensed by the inside temperature sensor from a desired value, a second sensed variable which is dependent on the condition sensed by said vehicle condition sensor, a third sensor variable which is proportional to the command variable determined by said intention sensing means, and a fourth sensed variable which is proportional to the variation of the command variable during a predetermined time interval;
   fuzzy inference means for storing a first membership function of the first sensed variable, a second membership function of the second sensed variable, a third membership function of the third sensed variable, and a fourth membership function of the fourth sensed variable and for determining a first output variable which is the value of the first membership function corresponding to the first sensed variable, a second output variable which is the value of the second membership function corresponding to the second sensed variable, a third output variable which is the value of the third membership function corresponding to the third sensed variable, and a fourth output variable which is the value of the fourth membership function corresponding to the fourth sensed variable;
   averaging means for determining a first average of the first and second output variables and a second average of the third and fourth output variables; and
   control signals producing means for producing the temperature control signal in accordance with the first average and the restraint control signal in accordance with the second average.

2. A vehicle air conditioning system according to claim 1 wherein said intention sensing means comprises an accelerator position sensor for sensing the position of a movable element of an accelerating system of the vehicle.

3. A vehicle air conditioning system according to claim 2 wherein said accelerator position sensor is a throttle sensor for sensing the degree of opening of a throttle valve of an engine of the vehicle.

4. A vehicle air conditioning system according to claim 3 wherein said control signal producing means comprises means for producing the temperature control signal by multiplying the first average by a predetermined first coefficient and for producing the restraint control signal by multiplying the second average by a predetermined second coefficient.

5. A vehicle air conditioning system according to claim 4, wherein said restraining actuator is an actuator for interrupting the cooling operation of said air conditioning equipment in accordance with the restraint control signal.

6. A vehicle air conditioning system according to claim 5 wherein said air conditioning equipment includes a compressor, and said restraining actuator comprises a clutch for interrupting the operation of said compressor.

7. A vehicle air conditioning system according to claim 6 further comprising means for enabling the driver to adjust the restraint control signal.

8. A vehicle air conditioning system according to claim 6 wherein the first and second averages are weighted averages.

9. A vehicle air conditioning system according to claim 6 wherein said vehicle condition sensor is an outside temperature sensor for sensing the ambient outside temperature.

10. A vehicle air conditioning system according to claim 6 wherein said vehicle condition sensor is an engine coolant temperature sensor for sensing the temperature of engine coolant.

11. A vehicle air conditioning system according to claim 6 wherein said vehicle condition sensor is an outside temperature sensor for sensing the ambient outside temperature, said system further comprising an engine coolant temperature sensor for sensing the temperature of engine coolant.

12. A vehicle air conditioning system according to claim 11 wherein said air conditioning equipment further comprises an air quantity control actuator for varying the quantity of the discharge air in accordance with an air quantity control signal, said system further comprising a sun sensor for sensing the intensity of solar radiation.

13. A vehicle air conditioning system according to claim 12 further comprising means for producing a first input signal representing the deviation of the inside temperature from the desired value, a second input signal representing the variation of the deviation of the inside temperature during a predetermined time period, a third input signal representing the engine coolant temperature, a fourth input signal representing the intensity of solar radiation, a fifth input signal representing the temperature difference between the inside and outside temperatures, a sixth input signal representing the variation of the degree of throttle opening during a predetermined time period, and a seventh input signal representing the degree of throttle opening, all of the input signals being input to said fuzzy inference means, wherein:

said fuzzy inference means comprises means for storing temperature control membership functions of the deviation of the inside temperature, the variation of the deviation, the engine coolant temperature, the intensity of solar radiation, and the temperature difference, air quantity control membership functions of the deviation of the inside temperature and the intensity of solar radiation, and restraint control membership functions of the degree of throttle opening and the variation of the degree of throttle opening, and means for determining temperature control output variables from the first, second, third, fourth, and fifth input signals by using the temperature control membership functions, air quantity control output variables from the first and fourth input signal by using the air quantity control membership functions, and restraint control output variables from the sixth and seventh input signals by using the restraint control membership functions;

said averaging means comprises means for determining a first weighted average of the temperature control output variables, a second weighted average of the air quantity control output variables, and a third weighted average of the restraint control output variables; and said control signal producing means comprises means for producing the air quantity control signal, wherein the temperature control signal produced by said control signal producing means is proportional to the first weighted average, the air quantity control signal which is produced by said control signal producing means is proportional to the second weighted average, and the restraint control signal which is produced by said control signal producing means is proportional to the third weighted average.

* * * * *

UNITED STATES PATENT AND TRADEMARK OFFICE
CERTIFICATE OF CORRECTION

PATENT NO. : 4,914,924
DATED : April 10, 1990
INVENTOR(S) : Takahashi

It is certified that error appears in the above-identified patent and that said Letters Patent is hereby corrected as shown below:

Column 7, line 55, change "sensor" (second occurrence) to --sensed--.

Column 8, line 13, change "signals" to --signal--.

Signed and Sealed this

Twenty-seventh Day of August, 1991

Attest:

HARRY F. MANBECK, JR.

Attesting Officer

Commissioner of Patents and Trademarks